United States Patent [19]
Naffziger

[11] Patent Number: 5,892,698
[45] Date of Patent: *Apr. 6, 1999

[54] 2'S COMPLEMENT FLOATING-POINT MULTIPLY ACCUMULATE UNIT

[75] Inventor: Samuel D. Naffziger, Fort Collins, Colo.

[73] Assignee: Hewlett-Packard Company, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 628,178

[22] Filed: Apr. 4, 1996

[51] Int. Cl.$^6$ ........................................................ G06F 7/38
[52] U.S. Cl. ........................................................ 364/748.07
[58] Field of Search ........................ 364/748.03, 748.07, 364/715.04

[56] References Cited

U.S. PATENT DOCUMENTS 4,969,118  11/1990  Montoye et al. ........................ 364/748
5,530,663   6/1996  Garcia et al. ............................ 364/748

OTHER PUBLICATIONS

Design of the IBM RISC System/6000 floating–point execution unit by R. Montoye, E. Hokenek and S.L. Runyon IBM J. Res. Develop. vol. 34 No. 1 Jan. 1990.

IEEE Standard for Binary Floating–Point Arithmetic Published by The Institute of Electrical and Electronics Engineers, Inc. Aug. 12, 1985.

*Primary Examiner*—Tan V. Mai

[57] ABSTRACT

A fully 2's complement FMAC (floating-point multiply accumulate unit) produces an unrounded output. The unrounded output is associated with a single INC bit, and is provided for early delivery as an FMAC operand. The INC bit is set using rounding logic which anticipates how a 2's complement conversion will affect a number, and then sets the INC bit in response to a rounding mode, and current L, G, S and sign bits. The rounding logic is configured to implement a truth table which demonstrates that rounding and 2's complement incrementation are mutually exclusive. When a bypassed result is received as an input to an FMAC, a delayed incrementer merges the unrounded C operand with its INC bit. The C incrementer and additional 2's complement conversion logic are placed approximately parallel with the multiply unit so that no additional delay is incurred in the FMAC's critical path. An INC bit corresponding to an A or B operand is absorbed within the FMAC's multiply unit. The FMAC allows an entire adder to be eliminated since the (A*B) result and C operand may be added in a single 2's complement adder rather than two carry propagate adders coupled to an end-around carry MUX.

20 Claims, 6 Drawing Sheets

| SIGN BIT | L BIT | G BIT | S BIT | ROUNDING MODE | ACTION |
|---|---|---|---|---|---|
| 0 | - | 0 | 0 | +INF | INC=0 |
| 0 | - | - | 1 | +INF | INC=1 |
| 0 | - | 1 | - | +INF | INC=1 |
| 1 | - | 0 | 0 | +INF | INC=0 |
| 1 | - | 0 | 1 | +INF | INC=0 |
| 1 | - | 1 | 0 | +INF | INC=1 |
| 1 | - | 1 | 1 | +INF | INC=0 |
| 0 | - | - | - | -INF | INC=0 |
| 1 | - | 0 | 0 | -INF | INC=1 |
| 1 | - | 0 | 1 | -INF | INC=1 |
| 1 | - | 1 | 0 | -INF | INC=1 |
| 1 | - | 1 | 1 | -INF | INC=1 |
| 0 | - | - | - | TO 0 | INC=0 |
| 1 | - | 0 | 0 | TO 0 | INC=0 |
| 1 | - | 0 | 1 | TO 0 | INC=0 |
| 1 | - | 1 | 0 | TO 0 | INC=1 |
| 1 | - | 1 | 1 | TO 0 | INC=0 |
| 0 | - | 0 | 0 | NEAR | INC=0 |
| 0 | - | 0 | 1 | NEAR | INC=0 |
| 0 | 0 | 1 | 0 | NEAR | INC=0 |
| 0 | 1 | 1 | - | NEAR | INC=1 |
| 0 | - | 1 | 1 | NEAR | INC=1 |
| 1 | 0 | 0 | 0 | NEAR | INC=0 |
| 1 | 1 | 0 | 0 | NEAR | INC=1 |
| 1 | 0 | 0 | 1 | NEAR | INC=0 |
| 1 | 1 | 0 | 1 | NEAR | INC=0 |
| 1 | 0 | 1 | 0 | NEAR | INC=1 |
| 1 | 1 | 1 | 0 | NEAR | INC=1 |
| 1 | 0 | 1 | 1 | NEAR | INC=1 |
| 1 | 1 | 1 | 1 | NEAR | INC=1 |

FIG. 3

2'S COMPLEMENT FLOATING-POINT MULTIPLY ACCUMULATE UNIT

BACKGROUND OF THE INVENTION

This invention pertains to a fully 2's complement floating-point multiply accumulate (FMAC) unit, and more particularly to a 2's complement FMAC producing an unrounded, inverted 2's complement result which is associated with a single INC bit (increment bit). A 2's complement FMAC has significant advantages over conventional signed magnitude FMAC's in that hardware components, including an entire adder, may be eliminated. Eliminating hardware not only reduces the costs to manufacture an FMAC, but also frees up space on the surface of an integrated circuit (IC). Those versed in the art appreciate the fact that use of surface area of an IC carries a premium, especially in the case of a VLSI (very large scale integrated) circuit such as a microprocessor.

In the design of microprocessor architecture, three very important considerations are speed, accuracy and cost. While it is desirable to design a microprocessor (CPU) which performs multiplication, addition and other operations with superior accuracy and at a very high rate of speed, it is also desirable to design a CPU which can be cost effectively manufactured.

Speed and accuracy have been greatly increased in recent years by fusing multiply and add operations into the accumulate operation (A*B)+C. If it is desired to merely add or multiply two numbers, the operation A*B can be performed by setting C=0, and the operation A+C can be performed by setting B=1. The component of a CPU which performs the (A*B)+C operation is commonly referred to as an FMAC (floating-point multiply accumulate unit) or MAF/FPU (multiply-add-fused floating-point unit). A conventional MAF/FPU design is disclosed by R. K. Montoye, E. Hokenek, and S. L. Runyon in "Design of the IBM RISC System/6000 Floating-Point Execution Unit," *IBM J. Res. Develop.* 34, 61–62 (January 1990).

The inputs to an FMAC are the operands A (multiplicand), B (multiplier) and C (addend), where A, B and C are floating-point numbers (floating-point numbers are numbers expressed in scientific notation). IEEE has issued the accepted standards for representing floating-point numbers. *ANSI/IEEE Standard for Binary Floating-Point Arithmetic,* STD 754-1985, IEEE, New York, Aug. 12, 1985. The convention given for representing single (32-bit) and double-precision (64-bit) floating-point numbers in binary form is [S,E,M], where S is a single bit determining the sign of a number, E is an exponent, and M is a mantissa or fraction (stripped of its leading 1). Thus, the form of an IEEE floating-point number is $[(-1)^s]*[2^{(E+Bias)}]*(1.M)$. In a single precision system, E is represented by eight bits, and M is represented by twenty-three bits (the twenty-three bit mantissa becomes a twenty-four bit mantissa when the floating-point number is input into an FMAC—operations performed internal to the FMAC require that a mantissa's implied leading 1 be present). In a double precision system, E is represented by eleven bits, and M is represented by fifty-two bits (fifty-three bits while the number is internal to the FMAC). The exponent Bias is 127 (single precision) or 1023 (double precision).

A multiplication of A and B requires multiplication of their mantissas, and addition of their exponents. If the mantissa of A (internal to the FMAC) comprises m-bits and the mantissa of B comprises n-bits, multiplication of their mantissas requires adding A to itself n-times, each time shifting the m-bits of A to the left by one bit. The result of the multiplication is an "m+n+1"-bit mantissa. The addition of (A*B) and C requires alignment of their mantissas through a comparison of the magnitude of their exponents, followed by addition of their mantissas. Using a leading bit anticipator and/or truncation, the accumulate output of an FMAC will be an "m–1"-bit mantissa (the leading 1 is once again stripped), an exponent, and a sign bit (in the form S,E,M). Bits truncated from, or otherwise shifted out of, the "m–1"-bit mantissa output may be used in rounding calculations.

IEEE outlines four rounding modes which a microprocessor, and more specifically an FMAC, must be capable of implementing. The modes are: 1) Round to Positive Infinity (+INF), 2) Round to Negative Infinity (–INF), 3) Round to Zero (ZERO), and 4) Round to Near (NEAR). Definitions and additional details concerning these rounding modes are found in IEEE Standard 754–1985, supra.

Operations such as addition are much simpler when numbers are represented in 2's complement form (i.e., positive numbers remain in signed magnitude form while negative numbers are inverted and then incremented by one). For instance, an add of two signed magnitude numbers requires a combination of two carry propagate adders followed by an end-around carry MUX (multiplexer). An add of two numbers in 2's complement form merely requires a single 2's complement adder. Adders are costly to implement, and detract from an FMAC's speed due to their extensive routing requirements. However, 2's complement notation has yet to be adopted within conventional FMACs. The failure to adopt 2's complement notation is believed to be due to 1) performance delays in converting to and from 2's complement notation, and 2) routing penalties in making an early unrounded FMAC result available as an FMAC operand (i.e., passing two INC bits—one for rounding purposes, and one for the purpose of converting negative numbers back into signed magnitude form).

It is therefore a primary object of this invention to provide a fully 2's complement FMAC.

It is a further object of this invention to provide a 2's complement FMAC in which an entire adder may be eliminated.

It is also an object of this invention to provide a 2's complement FMAC in which an unrounded result associated with a single INC bit may be passed back into the top of an FMAC.

It is yet another object of this invention to provide a 2's complement FMAC in which conversion to and from 2's complement notation may be performed in parallel with, or as a part of, other required operations, such that conversion does not add additional delay to the critical path of the FMAC.

It is also an object of this invention to provide a 2's complement FMAC which results in significant cost savings through the reduction in IC surface area required to implement the FMAC.

SUMMARY OF THE INVENTION

In the achievement of the foregoing objects, the inventor has devised an FMAC comprising a plurality of adders and shifters, a multiply unit, and a leading bit anticipator. These components are coupled to perform a 2's complement floating-point multiply accumulate operation of the form (A*B)+C, where A, B, and C are operands. The FMAC produces rounded and unrounded outputs. The unrounded output is associated with a single INC bit, and is provided for early delivery back into the top of the FMAC. The INC bit is set using rounding logic which anticipates how a 2's complement conversion will affect a number, and then sets the INC bit in response to a selected (or default) rounding mode, and current L, G, S and sign bits. The rounding logic is configured to implement a newly developed truth table which demonstrates that rounding and conversion from 2's complement notation are mutually exclusive events. Once passed back into the top of an FMAC, a delayed incrementer is provided for merging a C operand with its INC bit. The C incrementer may be placed approximately parallel with the multiply unit in the flow of data. In this manner, no additional delay is incurred in the FMAC's critical path. An INC bit corresponding to an A or B operand is absorbed within the FMAC's multiply unit. Preferably, the multiply unit is a Booth recoded multiply array of the type disclosed in the U.S. patent application of Naffziger entitled "Method of Performing Operand Increment In A Booth Recoded Multiply Array".

An FMAC of the above form allows an entire adder to be eliminated in that the (A*B) and C operands may be added in a single 2's complement adder rather than two carry propagate adders coupled to an end-around carry MUX.

Rounding and conversion back to signed magnitude form are determined in a single step, and by setting a single INC bit. Conversion into 2's complement form is absorbed within the multiply unit and parallel processes. Therefore, no additional delay or penalty is suffered in maintaining 2's complement representations of operands internal to the FMAC.

One may appreciate that the above summarized FMAC is less costly, smaller, and even faster than conventional signed magnitude FMACs.

These and other important advantages and objectives of the present invention will be further explained in, or will become apparent from, the accompanying description, drawings and claims.

BRIEF DESCRIPTION OF THE DRAWINGS

An illustrative and presently preferred embodiment of the invention is illustrated in the drawings in which:

FIG. 3 is a truth table which may be implemented as rounding logic to set a single INC bit in response to various rounding modes and combinations of L, G, S and sign bits;

DESCRIPTION OF THE PREFERRED EMBODIMENT

Figure 1:
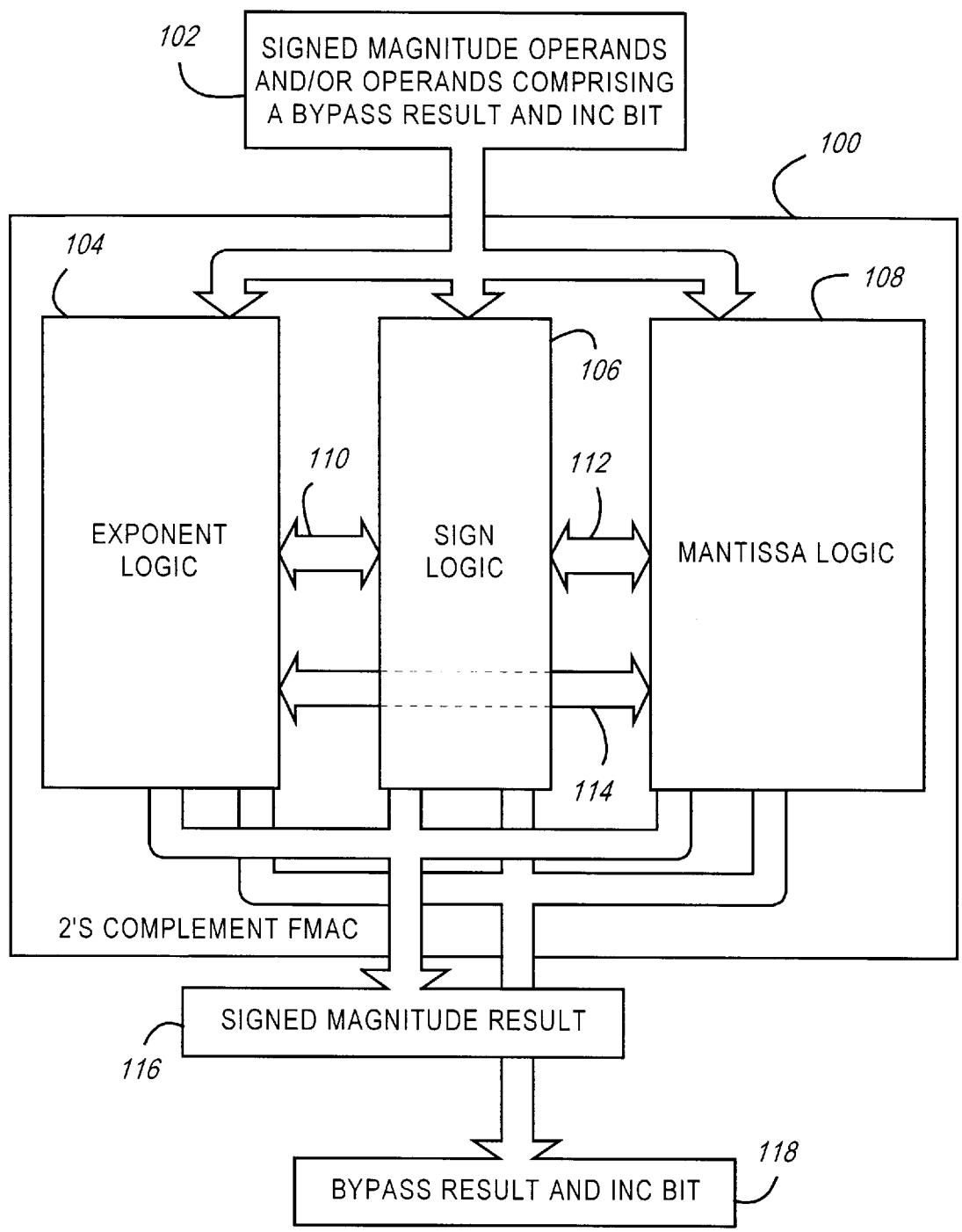
FIG. 1 is a schematic illustrating the general layout of a 2's complement FMAC.
Figure 2:
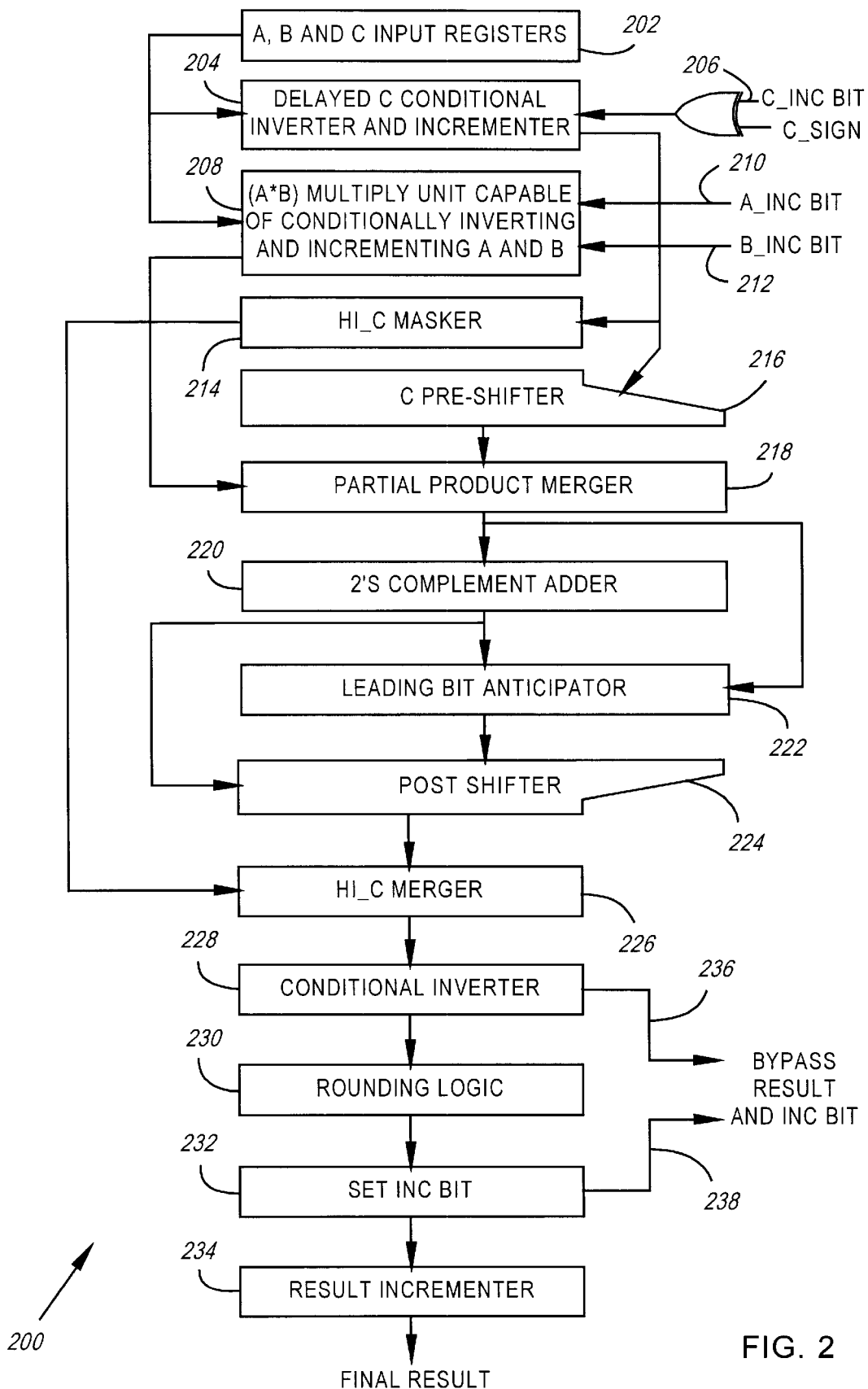
FIG. 2 is a schematic illustrating functional components of an FMAC through which mantissa data flows.

A schematic of a fully 2's complement floating-point multiply accumulate (FMAC) unit 100 is pictured in FIGS. 1 and 2. The FMAC 100 may generally comprise a plurality of adders 220 and shifters 216, 224, a multiply unit 208, and a leading bit anticipator 222, coupled to perform a 2's complement floating-point multiply accumulate operation. The accumulate operation is of the form (A*B)+C, where A, B, and C are operands in 2's complement form.

Figure 4:
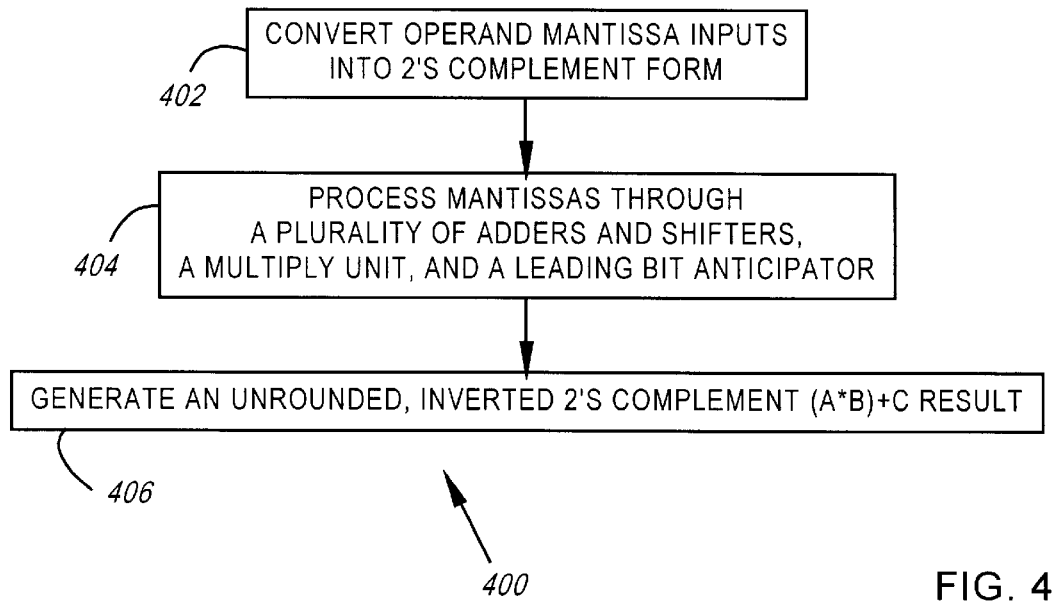
FIG. 4 is a flow chart illustrating a method of handling mantissa data within an FMAC.

A method 400 of structuring mantissa data flow and handling within an FMAC 100 having inputs A, B and C is presented in FIG. 4. The method 400 may generally commence with conversion 402 of mantissa inputs into 2's complement form. The mantissas are then processed 404 through a plurality of adders 218, 220 and shifters 216, 224, a multiply unit 208, and a leading bit anticipator 222. Finally, an unrounded, inverted 2's complement mantissa of the form (A*B)+C is generated 406.

Figure 5:
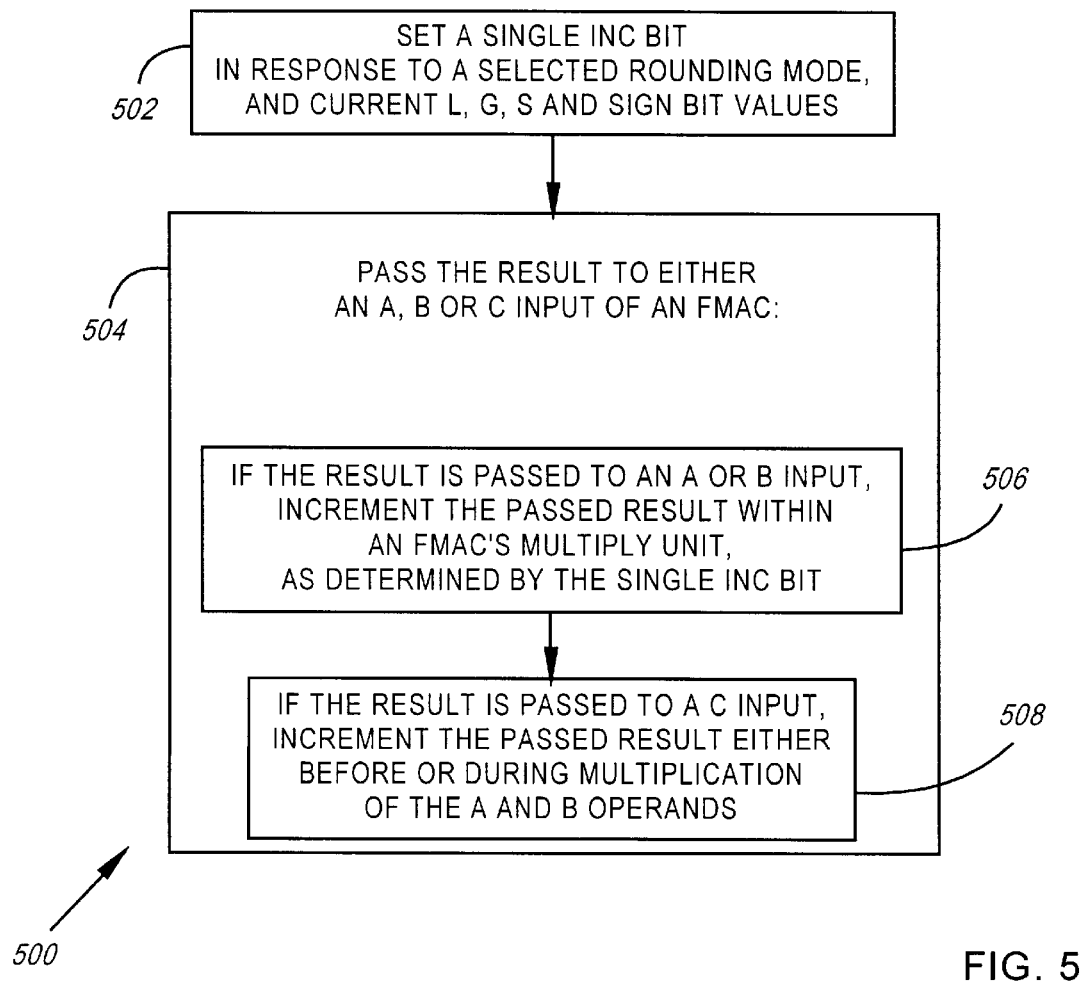
FIG. 5 is a flow chart illustrating the steps involved in passing a 2's complement result to either an A, B or C input of an FMAC.

A method 500 of passing an unrounded, conditionally inverted 2's complement result to either an A, B or C input of an FMAC 100 is presented in FIG. 5. The method begins with the setting of a single INC bit 502 in response to a selected (or default) rounding mode, and current L, G, S and sign bit values. The result is then passed 504 along with its corresponding INC bit. If the result is passed to an A or B FMAC input, the result is incremented 506 within the FMAC's multiply unit, as determined by the single INC bit. If the result is passed to an FMAC's C input, the result is incremented 508 either before or during multiplication of the FMAC's A and B operands.

Having thus described the 2's complement FMAC 100 and methods of using same 400, 500 in general, the physical layout and operation of the FMAC 100 will now be described in further detail.

A preferred embodiment of a 2's complement FMAC 100 is illustrated in FIGS. 1 and 2. Signed magnitude operands, bypass results with INC bits, or a combination of the two. 102 may be input into a 2's complement FMAC 100 as shown in FIG. 1. Bypass results with INC bits 118 are described more fully in the following description, but in general, they comprise a sign bit, an exponent, a mantissa in inverted 2's complement form (that is, positive numbers are unaffected, but negative numbers are in inverted 2's complement form), and an INC bit. As will be shown below, the single INC bit associated with a bypass result may be used to control 1) whether a negative number in inverted 2's complement form is incremented, and 2) whether a number is rounded.

Logic 104, 106, 108 within the FMAC 100 is used to calculate (A*B)+C, where A, B and C are operands comprising a sign bit, an exponent, and a mantissa in two's complement form. For the most part, operations are performed in parallel on the operands' sign bits, exponents and mantissas, and operations performed on one component of an operand are largely independent of operations performed on another component of an operand. However, as shown in FIG. 1, bits of information may be passed 110, 112, 114 between the various logic blocks 104, 106, 108 as needed.

The output of the 2's complement FMAC 100 may comprise either a signed magnitude result (a final result) 116 or a bypass result with an associated INC bit 118. The bypass result with INC 118 bit may be input into the FMAC 100 as an operand, or alternatively, the signed magnitude result 116 may be returned to a microprocessor.

The changes which need to be made to a conventional FMAC in order to construct a 2's complement FMAC 100 lie largely in the mantissa logic 108. Modifications to exponent 104 and sign 106 logic are 'de minimis', and can readily be implemented by one skilled in the art after a review of the following disclosure.

A preferred embodiment 200 of the mantissa logic 108 of a 2's complement FMAC 100 is shown in FIG. 2. Operands are received into the FMAC by A, B and C input registers 202. The operands will most likely be in signed magnitude form, and must therefore be converted to 2's complement form. Conversion comprises an inversion and incrementation of negative numbers. For C operands, conversion is accomplished by a delayed C conditional inverter and incrementer 204 (regardless of whether the C operand is in signed magnitude form, or in the form of a bypass result with INC bit). The bit which is used to increment the C operand on conversion is the output of an XOR gate having a C_INC bit 206 (an increment bit corresponding to the C operand) and a C_SIGN bit (a bit corresponding to the sign of C) as its inputs. Since the INC bit is technically absorbed before inversion, and the 2's complement conversion bit is absorbed after inversion, existence of both has a null effect on the operand. For negative A and B operands, conversion is accomplished within the (A*B) multiply unit 208. Note that conversion of a negative C operand occurs in parallel with multiplication of the A and B operands. In this manner, conversion of a C operand will not increase the delay of an FMAC 100.

Multiplication algorithms for 2's complement numbers are well known in the art. A preferred form of 2's complement multiply unit 208 is a Booth recoded multiply unit. Booth's algorithm is discussed in the U.S. Pat. No. 5,677,863 of Naffziger entitled "Method of Performing Operand Increment in a Booth Recoded Multiply Array", which is hereby incorporated by reference for all that it discloses. While inversion of numbers is a simple process adding little delay to a multiply unit 208, incrementation has traditionally been performed by adding an additional row of carry save adders to the multiply unit 208 and adding the multiplicand and/or multiplier (and possibly an additional term if both the multiplicand and multiplier need to be incremented) into the multiply result. To avoid these additional delays, a novel method of incrementing an A and/or B operand within a Booth recoded multiply unit has been disclosed in the U.S. patent application of Naffziger entitled "Method of Performing Operand Increment in a Booth Recoded Multiply Array".

The multiply unit 208 comprises rows of carry-save adders which deliver a number of 2's complement partial products. These partial products are merged 218 with a shifted C operand (i.e., the low order portion of C), and then summed in a single 2's complement adder 220 (i.e., a carry propagate adder). The low order portion of C (that portion of C which overlaps the (A*B) multiply result) is separated from the high order portion of C (HI_C) by a HI_C masker 214. The low order portion of C is then aligned with the (A*B) multiply result (i.e., the partial products) using an appropriate shifter 216. For a detailed discussion of aligning the low order portion of C with the (A*B) multiply result, one is referred to the U.S. patent application of Naffziger et al. filed Nov. 30, 1995, Ser. No. 08/566,415, entitled "Method of Decoupling the High Order Portion of the Addend from the Multiply Result in an FMAC", which is hereby incorporated by reference for all that it discloses.

A 2's complement adder 220, in combination with a partial product merger 218, may sometimes be referred to herein as "2's complement adding logic".

It is important to note that conventional FMAC's, which operate on signed magnitude operands, require a one's complement adder to add the (A*B) multiply result and C. In reality, a one's complement adder is a combination of two carry propagate adders followed by an end-around carry multiplexer (these adders are in addition to the partial product merger 218). One can appreciate that the FMAC 100 disclosed in FIGS. 1 and 2 eliminates a source of significant cost and delay. Adding via two carry propagate adders and an end-around carry multiplexer (MUX) requires more surface area to implement, but it also results in additional delay due to lengthy wire routings.

In parallel with the 2's complement addition of (A*B) and C, a leading bit anticipator 222 is used on the output of the partial product merger 218. The output of the leading bit anticipator 222 is then used to control the shift lines in a post shifter 224 (the post shifter 224, together with the leading bit anticipator 222 may sometimes be referred to herein as "normalization logic"). The post-shifted result will therefore be normalized (i.e., either 1) a logic "1" will be present in the MSB (most significant bit) position, or 2) the (A*B)+C result will be aligned for a merger with HI_C), and in 2's complement form. Any high order portion of C (HI_C) is now merged 226 with the post-shifted result (as described in the aforementioned patent application of Naffziger et al. entitled "Method of Decoupling the High Order Portion of the Addend from the Multiply Result in an FMAC").

In a conventional FMAC, rounding logic would now implement the IEEE rounding standard, and if necessary, set an INC bit (increment bit). An unrounded result and INC bit (collectively referred to as a "bypass result") could then be routed back into the FMAC as either an A, B or C operand. Alternatively, the INC bit could be added to the unrounded result for delivery of a rounded final result (for use elsewhere within a microprocessor). However, in a 2's complement FMAC 100, an unrounded 2's complement result must be 1) converted back to IEEE signed magnitude form, and 2) rounded based on the IEEE rounding standard. The obvious solution is to set two INC bits, the first indicating whether a result needs to be incremented as part of its conversion back to signed magnitude form, and a second indicating whether a number needs to be rounded. However, it is well known in the art that early bypass of an unrounded FMAC result becomes extremely more complex and inefficient if more than one INC bit needs to be passed along with the result.

An extremely important aspect of this invention is the merging of signed magnitude conversion and rounding in a single step. By merging the steps of conversion and rounding, only a single INC bit need be set.

Figure 7:
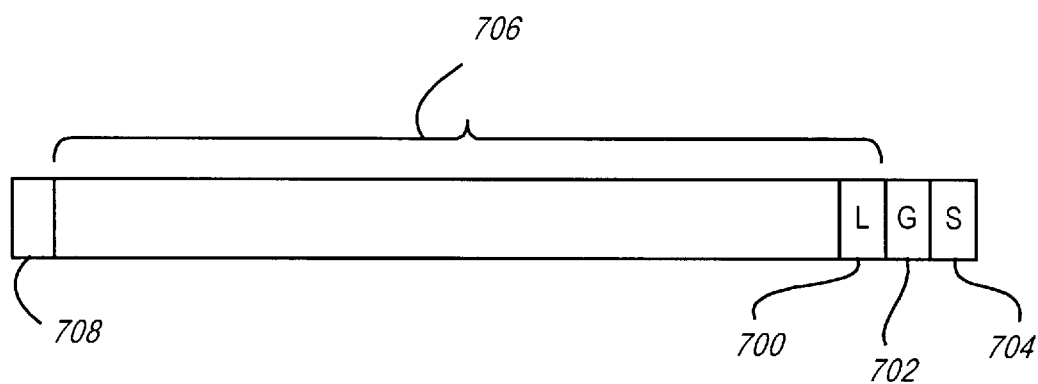
FIG. 7 is a diagram illustrating the relationship of mantissa data bits.

In combining conversion and rounding in a single step, the rounding table of FIG. 3 was developed and verified. The table's entries were derived by anticipating how a 2's complement conversion would affect a number's L, G and S bits, and then using the IEEE rounding standard to determine whether a rounding increment was needed in addition to any conversion increment. A number's L 700, G 702 and S 704 bits are shown graphically in FIG. 7. The L bit 700 is the least significant bit of a mantissa 706 (whether the mantissa be part of a bypass 118 or final 116 result). The G (guard) and S (sticky) bits 702, 704 are bits of lost precision used only in rounding. The guard bit 702 is the bit immediately less significant than the L bit 700 and represents the last bit shifted out of the mantissa 706 during normalization. The sticky bit 704 is of less significance than the guard bit 702 and represents the logical "OR" of all additional bits shifted off the right of the mantissa 706 during normalization.

In generating the table of FIG. 3, it was discovered that if a "1" is added to a result during its conversion to signed magnitude form, there is no need for an additional rounding increment. The two events are mutually exclusive.

Details of the FIG. 3 rounding table (truth table), and more specifically, the differences between standard IEEE rounding and a combined 2's complement conversion/round will now be examined. First note that the values given in the FIG. 3 table, and each of the tables presented below, presume that the FMAC's unrounded result has already been conditionally inverted (i.e., the negative results have been inverted), and that the L and G bits are extracted from the unrounded result in inverted form.

When rounding a positive signed magnitude number to positive infinity (+INF), the number is incremented (INC=1) if either the guard (G bit) or sticky bit (S bit) is set (lines B and C, Table 1), regardless of the value of the number's least significant bit (L bit). Negative signed magnitude numbers are merely truncated (INC=0, line D, Table 1).

TABLE 1

Standard IEEE Round to +INF

| | SIGN BIT | L BIT | G BIT | S BIT | ROUNDING MODE | ACTION |
|---|---|---|---|---|---|---|
| A | 0 | — | 0 | 0 | +INF | INC = 0 |
| B | 0 | — | — | 1 | +INF | INC = 1 |
| C | 0 | — | 1 | — | +INF | INC = 1 |
| D | 1 | — | — | — | +INF | INC = 0 |

When combining 1) an IEEE round to +INF of a 2's complement number with 2) a conversion of the number to signed magnitude form, the positive rounding cases (SIGN=0, lines A through C, Table 2) remain identical to the IEEE rounding standard (SIGN=0, lines A through C, Table 1). However, the following changes must be made to the negative case (line D, Table 1). Note that signed magnitude negative numbers are never incremented.

TABLE 2

Two's Complement Round to +INF

| | SIGN BIT | L BIT | G BIT | S BIT | ROUNDING MODE | ACTION |
|---|---|---|---|---|---|---|
| A | 0 | — | 0 | 0 | +INF | INC = 0 |
| B | 0 | — | — | 1 | +INF | INC = 1 |
| C | 0 | — | 1 | — | +INF | INC = 1 |
| D1 | 1 | — | 0 | 0 | +INF | INC = 0 |
| D2 | 1 | — | 0 | 1 | +INF | INC = 0 |
| D3 | 1 | — | 1 | 0 | +INF | INC = 1 |
| D4 | 1 | — | 1 | 1 | +INF | INC = 0 |

In negative case D1, S=0 meaning that no 1's were shifted off the right of the mantissa during normalization. Inversion of the S bit during 2's complement conversion sets it to a value of "1". When the 2's complement conversion increment is applied (its applied to the S bit), a carry is generated and absorbed by the G bit (a logic "0"). There is no carry into the L bit, and the G and S bits are truncated as per the IEEE standard.

In case D2, at least one "1" was shifted out of the mantissa, thus setting the S bit. On invert, the S bit becomes a zero. When the 2's complement increment is applied, it is absorbed by the S bit. Again, no carry is generated into the L bit, and the G and S bits are again truncated.

In case D3, an inversion of the S bit generates a carry across S and G when the 2's complement increment is applied. The carry increments into the mantissa, and thus requires a setting of the INC bit (INC=1). However, after completing the 2's complement increment, the G and S bits are truncated, and no additional increment is needed.

In the final negative case, D4, the 2's complement increment is again absorbed by the inverted S bit (S=0) and no increment is needed.

When rounding to −INF, the IEEE rounding standard dictates that positive signed magnitude numbers are truncated (not rounded), while negative numbers are incremented if either G or S is set (See Table 3).

TABLE 3

Standard IEEE Round to −INF

| | SIGN BIT | L BIT | G BIT | S BIT | ROUNDING MODE | ACTION |
|---|---|---|---|---|---|---|
| E | 0 | — | — | — | −INF | INC = 0 |
| F | 1 | — | 0 | 0 | −INF | INC = 0 |
| G | 1 | — | — | 1 | −INF | INC = 1 |
| H | 1 | — | 1 | — | −INF | INC = 1 |

However, when combining rounding with a 2's complement conversion, modifications must once again be made to the negative cases (the positive case stays the same).

TABLE 4

Two's Complement Round to −INF

| | SIGN BIT | L BIT | G BIT | S BIT | ROUNDING MODE | ACTION |
|---|---|---|---|---|---|---|
| E | 0 | — | — | — | −INF | INC = 0 |
| F1 | 1 | — | 0 | 0 | −INF | INC = 1 |
| G1 | 1 | — | 0 | 1 | −INF | INC = 1 |
| H1 | 1 | — | 1 | 0 | −INF | INC = 1 |
| J | 1 | — | 1 | 1 | −INF | INC = 1 |

For negative case F1, S=G=0, incrementation would normally not occur. However, a conversion to 2's complement form will cause an inversion of S, and a carry into G after incrementation. This is equivalent to the standard case where "either G or S is set", and hence incrementation is required as part of rounding.

For case G1, S becomes a zero after inversion, and therefore absorbs the 2's complement increment. However, the INC bit is once again set because "either G or S is set".

In case H1, inversion of S sets to a logic "1". With both G and S being set, the 2's complement increment carries across both S and G and into the mantissa. The INC must therefore be set. However, after completing the conversion, both S and G are now zero and a rounding increment is no longer required.

Finally, in case J, S=G=1. On invert, S is set to 0 and is able to absorb the 2's complement increment, but the INC bit is set since "either G or S is set".

IEEE rounding to zero is a combination of the +INF and −INF cases. −INF rounding cases are used for positive numbers, and +INF rounding cases are used for negative numbers. The standard case:

TABLE 5

Standard IEEE Round to Zero

| | SIGN BIT | L BIT | G BIT | S BIT | ROUNDING MODE | ACTION |
|---|---|---|---|---|---|---|
| E | 0 | — | — | — | TO 0 | INC = 0 |
| D | 1 | — | — | — | TO 0 | INC = 0 | thus becomes:

TABLE 6

Two's Complement Round to Zero

|    | SIGN BIT | L BIT | G BIT | S BIT | ROUNDING MODE | ACTION   |
|----|----------|-------|-------|-------|---------------|----------|
| E  | 0        | —     | —     | —     | TO 0          | INC = 0  |
| D1 | 1        | —     | 0     | 0     | TO 0          | INC = 0  |
| D2 | 1        | —     | 0     | 1     | TO 0          | INC = 0  |
| D3 | 1        | —     | 1     | 0     | TO 0          | INC = 1  |
| D4 | 1        | —     | 1     | 1     | TO 0          | INC = 0  |

The round to near case is more involved. The IEEE standard states that the sticky bit (S bit) is the tiebreaker if the L, G, and S bits of a number correspond to "x.1x" (i.e., G=1). However, if the sticky bit is zero (S=0), then the L bit is examined. If L=1, indicating an odd number, then the result is incremented. Otherwise, it is not.

TABLE 7

Standard IEEE Round to Near

|   | SIGN BIT | L BIT | G BIT | S BIT | ROUNDING MODE | ACTION  |
|---|----------|-------|-------|-------|---------------|---------|
| K | —        | —     | 0     | 0     | NEAR          | INC = 0 |
| L | —        | —     | 0     | 1     | NEAR          | INC = 0 |
| M | —        | 0     | 1     | 0     | NEAR          | INC = 0 |
| N | —        | 1     | 1     | —     | NEAR          | INC = 1 |
| P | —        | —     | 1     | 1     | NEAR          | INC = 1 |

When combining the above table with 2's complement conversion, the following table (with changes in the negative cases) results:

TABLE 8

Two's Complement Round to Near

|    | SIGN BIT | L BIT | G BIT | S BIT | ROUNDING MODE | ACTION  |
|----|----------|-------|-------|-------|---------------|---------|
| K  | 0        | —     | 0     | 0     | NEAR          | INC = 0 |
| L  | 0        | —     | 0     | 1     | NEAR          | INC = 0 |
| M  | 0        | 0     | 1     | 0     | NEAR          | INC = 0 |
| N  | 0        | 1     | 1     | —     | NEAR          | INC = 1 |
| P  | 0        | —     | 1     | 1     | NEAR          | INC = 1 |
| K1 | 1        | 0     | 0     | 0     | NEAR          | INC = 0 |
| K2 | 1        | 1     | 0     | 0     | NEAR          | INC = 1 |
| L1 | 1        | 0     | 0     | 1     | NEAR          | INC = 0 |
| L2 | 1        | 1     | 0     | 1     | NEAR          | INC = 0 |
| M1 | 1        | 0     | 1     | 0     | NEAR          | INC = 1 |
| N1 | 1        | 1     | 1     | 0     | NEAR          | INC = 1 |
| P1 | 1        | 0     | 1     | 1     | NEAR          | INC = 1 |
| Q  | 1        | 1     | 1     | 1     | NEAR          | INC = 1 |

In case K1, inversion results in L, G and S bits of "0.01", and incrementation yields L, G and S bits of "0.10". This is equivalent to case M, and hence no increment is needed.

In case K2, conversion yields L, G, and S bits of "1.10". This is equivalent to case N, and hence the INC bit needs to be set.

For case L1, the 2's complement increment gets absorbed by the inverted sticky bit, and the case is equivalent to case L. As a result, the INC bit need not be set.

The next case, L2, is once again equivalent to case L, and no increment is not needed.

In case M1, the incrementation required by conversion carries into the L bit. Thus, even though an increment is not required for rounding (case K), the INC bit must still be set.

Case N1 is similar to case M1.

In case P1, conversion to signed magnitude form yields L, G and S bits of "0.11" which are equivalent to those in case P, and the INC bit must be set.

Finally, conversion in case Q yields bits which are equivalent to those in cases N or P. While conversion does not require setting of the INC bit, rounding does require that it again be set.

After reviewing the 2's complement conversion/rounding table in detail, note again the exclusivity of rounding and conversion. One or the other, but not both, may cause the shared INC bit to be set.

Hardware for implementing the FIG. 3 rounding/conversion table may easily be developed by one skilled in the art and is beyond the scope of this description.

Figure 6:
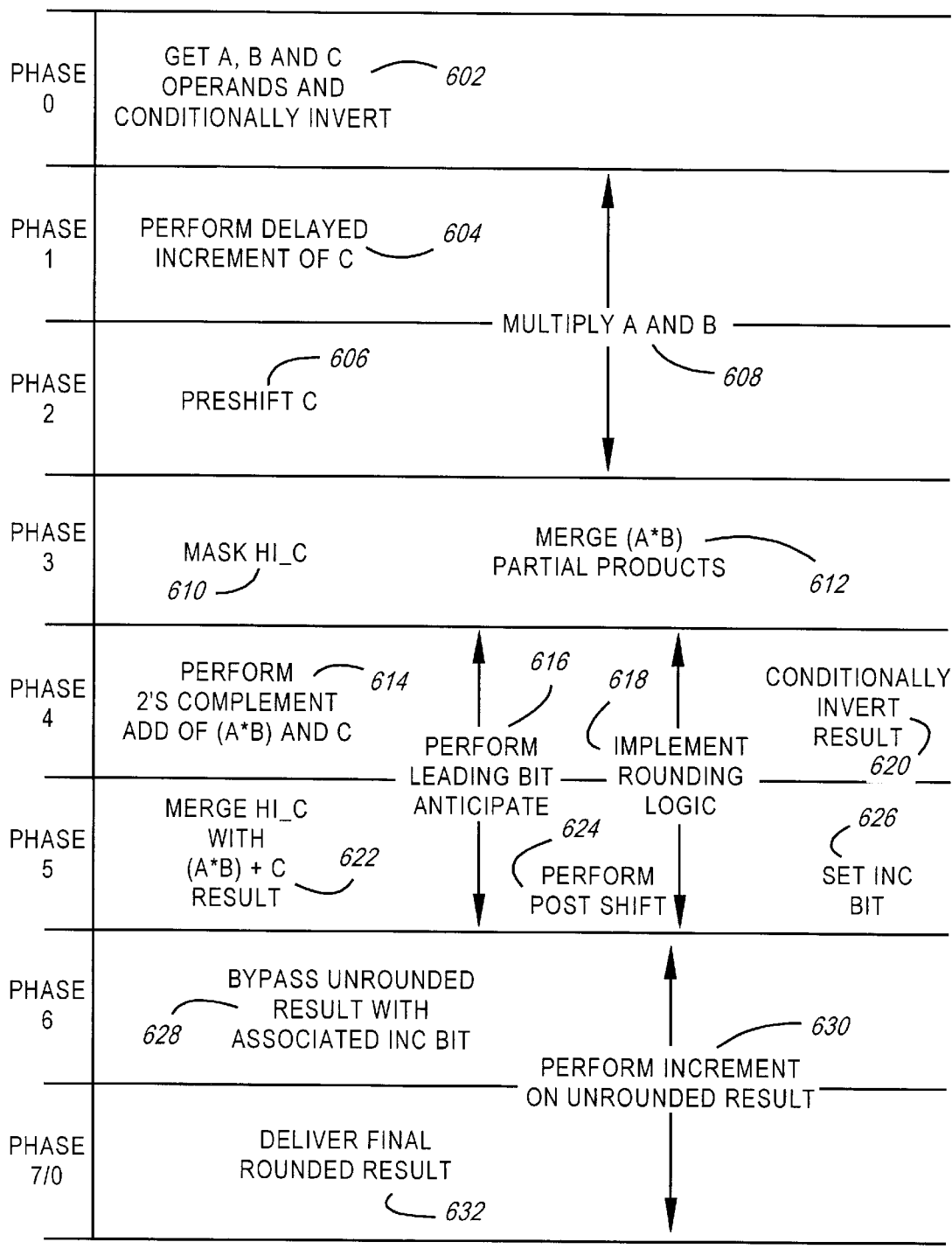
FIG. 6 is a diagram illustrating the performance of 2's complement FMAC operations in seven phases (six when bypassing an unrounded result)

A preferred timing/phase diagram 600 for a fully 2's complement FMAC is illustrated in FIG. 6. Operands A, B and C are retrieved and conditionally inverted 602 in phase zero. A delayed increment of the C operand 604, absorbing any INC bit associated with a unrounded bypass result, is performed in phase one. Multiplication of the A and B operands 608 also begins in phase one and is completed by the end of phase two. The low order portion of C is shifted 606 pursuant to the teachings of Naffziger et al.'s patent application entitled "Method of Decoupling the High Order Portion of the Addend from the Multiply Result in an FMAC" in phase two. In phase three, HI_C is masked 610, and the (A*B) partial products are merged with the low order portion of C 612. A 2's complement add 614 of (A*B) and C is performed in phase four, and the result of the add is conditionally inverted 620. Simultaneously, a leading bit anticipate 616 is begun on the result, and the table of FIG. 3 is implemented in rounding logic 618. The leading bit anticipate 616 and rounding 618 procedures are continued in phase five. Also in phase five, the unrounded (A*B)+C result is normalized 624, and any HI_C is merged 622 with the normalized result. As the rounding/conversion process 618 is completed, the INC bit is set 626. In phase six, the unrounded (A*B)+C result is bypassed 628 along with its corresponding INC bit. At the same time, the FMAC's result is rounded 630 so that a rounded final result may be delivered 632 in phase seven/zero.

Note that the INC bit is set in phase five, after normalization, but before the bypass in phase six. However, the actual round, which is an add of the INC bit and the unrounded or bypass result, occurs formally in phase six (for delivery of a final result) and/or as a delayed increment in phases one and two of the next cycle (for a bypassed result).

In Naffziger et al.'s patent application entitled "Method of Decoupling the High Order Portion of the Addend from the Multiply Result in an FMAC", a case is discussed wherein C is of a much greater order of magnitude than (A*B) (i.e., EXP(C)>>EXP(A*B)). In such a case (herein designated as a case of BIGC), the rounding and conversion logic must implement the following algorithm for a BIGC_INC (setting an increment corresponding to the BIGC result):

((MODE=NEAREST) & C_SIGN) |
((MODE=TO_ZERO) & ((AXB_SIGN&C_SIGN) |
    (C_SIGN&AXB_ZERO))) |
((MODE=PLUS_INF) & C_SIGN & (AXB_ZERO|AXB_SIGN)) |
((MODE=MINUS_INF) & C_SIGN;

In the above algorithm, C_SIGN and AXB_SIGN refer to the signs of operands C or A×B. AXB_ZERO refers to a an A×B result which is equal to zero.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A floating-point multiply accumulate unit (FMAC) for performing 2's complement accumulate operations of a form (A*B)+C, where A, B, and C are operands, comprising:
   a) a 2's complement (A*B) multiply unit having A and B operand inputs and producing (A*B) partial products;
   b) a shifter for aligning a portion of a C operand with the (A*B) partial products;
   c) 2's complement adding logic for adding the aligned portion of the C operand to the (A*B) partial products to thereby produce a sum;
   d) normalization logic, coupled with the 2's complement adding logic, for normalizing the sum; and
   e) logic, coupled to the normalization logic, for generating an unrounded bypass result, a single increment bit which is indicative of whether the unrounded bypass result needs to be incremented, and a final rounded result.

2. An FMAC as in claim 1, further comprising:
   a) a delayed C incrementer for receiving a previously generated unrounded bypass result and single increment bit as a C operand input to the FMAC; wherein:
   b) the delayed C incrementer provides an output to said shifter; and
   c) the 2's complement (A*B) multiply unit comprises delayed incrementers for incrementing A and/or B operands comprising a previously generated unrounded bypass result and single increment bit.

3. An FMAC as in claim 2, wherein the delayed C incrementer is approximately parallel to the 2's complement (A*B) multiply unit in a flow of data through the FMAC.

4. An FMAC as in claim 1, wherein the logic coupled to the normalization logic comprises 2's complement rounding logic for setting the single increment bit which is indicative of whether the unrounded bypass result needs to be incremented.

5. An FMAC as in claim 4, wherein said 2's complement rounding logic sets the single increment bit (INC bit) in response to a selected rounding mode, and current L, G, S and sign bit values.

6. An FMAC as in claim 5, wherein said 2's complement rounding logic implements the following truth table:

| SIGN BIT | L BIT | G BIT | S BIT | ROUNDING MODE | ACTION |
|---|---|---|---|---|---|
| 0 | — | 0 | 0 | +INF | INC = 0 |
| 0 | — | — | 1 | +INF | INC = 1 |
| 0 | — | 1 | — | +INF | INC = 1 |
| 1 | — | 0 | 0 | +INF | INC = 0 |
| 1 | — | 0 | 1 | +INF | INC = 0 |
| 1 | — | 1 | 0 | +INF | INC = 1 |
| 1 | — | 1 | 1 | +INF | INC = 0 |
| 0 | — | — | — | −INF | INC = 0 |
| 1 | — | 0 | 0 | −INF | INC = 1 |
| 1 | — | 0 | 1 | −INF | INC = 1 |
| 1 | — | 1 | 0 | −INF | INC = 1 |
| 1 | — | 1 | 1 | −INF | INC = 1 |
| 0 | — | — | — | TO 0 | INC = 0 |
| 1 | — | 0 | 0 | TO 0 | INC = 0 |
| 1 | — | 0 | 1 | TO 0 | INC = 0 |
| 1 | — | 1 | 0 | TO 0 | INC = 1 |
| 1 | — | 1 | 1 | TO 0 | INC = 0 |

-continued

| SIGN BIT | L BIT | G BIT | S BIT | ROUNDING MODE | ACTION |
|---|---|---|---|---|---|
| 0 | — | 0 | 0 | NEAR | INC = 0 |
| 0 | — | 0 | 1 | NEAR | INC = 0 |
| 0 | 0 | 1 | 0 | NEAR | INC = 0 |
| 0 | 1 | 1 | — | NEAR | INC = 1 |
| 0 | — | 1 | 1 | NEAR | INC = 1 |
| 1 | 0 | 0 | 0 | NEAR | INC = 0 |
| 1 | 1 | 0 | 0 | NEAR | INC = 1 |
| 1 | 0 | 0 | 1 | NEAR | INC = 0 |
| 1 | 1 | 0 | 1 | NEAR | INC = 0 |
| 1 | 0 | 1 | 0 | NEAR | INC = 1 |
| 1 | 1 | 1 | 0 | NEAR | INC = 1 |
| 1 | 0 | 1 | 1 | NEAR | INC = 1 |
| 1 | 1 | 1 | 1 | NEAR | INC = 1 |

7. An FMAC as in claim 5, further comprising:
   a) a delayed C incrementer for receiving a previously generated unrounded bypass result and single increment bit as a C operand input to the FMAC; wherein:
   b) the delayed C incrementer provides an output to said shifter; and
   c) the 2's complement (A*B) multiply unit comprises delayed incrementers for incrementing A and/or B operands comprising a previously generated unrounded bypass result and single increment bit.

8. An FMAC as in claim 7, wherein the 2's complement (A*B) multiply unit is a Booth recoded multiply unit.

9. An FMAC as in claim 7, wherein:
   a) the delayed C incrementer is approximately parallel with the 2's complement (A*B) multiply unit in a flow of data through the FMAC; and
   b) the 2's complement rounding logic follows the 2's complement (A*B) multiply unit in the flow of data.

10. In one or more floating-point multiply accumulate units (FMACs), each unit comprising a plurality of adders and shifters, a multiply unit, and a leading bit anticipator, coupled to perform a 2's complement floating-point multiply accumulate operation, said accumulate operation being of a form (A*B)+C, where A, B, and C are operands, a method of passing an unrounded result to either an A, B or C input of an FMAC, the method comprising:
   a) setting a single increment bit (INC bit) corresponding to the unrounded result, in response to a selected rounding mode, and current L, G, S and sign bit values;
   b) passing the result to either an A, B or C input of an FMAC; and
       i) if the unrounded result is passed to an A or B input, incrementing the unrounded result within an FMAC's multiply input, as determined by the single INC bit; and
       ii) if the unrounded result is passed to a C input, incrementing the unrounded result either before or during multiplication of the A and B operands.

11. A method as in claim 10, wherein setting a single INC bit comprises implementing the following truth table:

| SIGN BIT | L BIT | G BIT | S BIT | ROUNDING MODE | ACTION |
|---|---|---|---|---|---|
| 0 | — | 0 | 0 | +INF | INC = 0 |
| 0 | — | — | 1 | +INF | INC = 1 |
| 0 | — | 1 | — | +INF | INC = 1 |
| 1 | — | 0 | 0 | +INF | INC = 0 |
| 1 | — | 0 | 1 | +INF | INC = 0 |

-continued

| SIGN BIT | L BIT | G BIT | S BIT | ROUNDING MODE | ACTION |
|---|---|---|---|---|---|
| 1 | — | 1 | 0 | +INF | INC = 1 |
| 1 | — | 1 | 1 | +INF | INC = 0 |
| 0 | — | — | — | -INF | INC = 0 |
| 1 | — | 0 | 0 | -INF | INC = 1 |
| 1 | — | 0 | 1 | -INF | INC = 1 |
| 1 | — | 1 | 0 | -INF | INC = 1 |
| 1 | — | 1 | 1 | -INF | INC = 1 |
| 0 | — | — | — | TO 0 | INC = 0 |
| 1 | — | 0 | 0 | TO 0 | INC = 0 |
| 1 | — | 0 | 1 | TO 0 | INC = 0 |
| 1 | — | 1 | 0 | TO 0 | INC = 1 |
| 1 | — | 1 | 1 | TO 0 | INC = 0 |
| 0 | — | 0 | 0 | NEAR | INC = 0 |
| 0 | — | 0 | 1 | NEAR | INC = 0 |
| 0 | 0 | 1 | 0 | NEAR | INC = 0 |
| 0 | 1 | 1 | — | NEAR | INC = 1 |
| 0 | — | 1 | 1 | NEAR | INC = 1 |
| 1 | 0 | 0 | 0 | NEAR | INC = 0 |
| 1 | 1 | 0 | 0 | NEAR | INC = 1 |
| 1 | 0 | 0 | 1 | NEAR | INC = 0 |
| 1 | 1 | 0 | 1 | NEAR | INC = 0 |
| 1 | 0 | 1 | 0 | NEAR | INC = 1 |
| 1 | 1 | 1 | 0 | NEAR | INC = 1 |
| 1 | 0 | 1 | 1 | NEAR | INC = 1 |
| 1 | 1 | 1 | 1 | NEAR | INC = 1 |

12. 2's complement rounding logic which sets a single INC bit in response to a selected rounding mode, and current L, G, S and sign bits, the logic comprising:
   a) L, G, S and sign bit inputs;
   b) a rounding mode input; and
   c) means, cooperating with said inputs, for implementing the following truth table:

| SIGN BIT | L BIT | G BIT | S BIT | ROUNDING MODE | ACTION |
|---|---|---|---|---|---|
| 0 | — | 0 | 0 | +INF | INC = 0 |
| 0 | — | — | 1 | +INF | INC = 1 |
| 0 | — | 1 | — | +INF | INC = 1 |
| 1 | — | 0 | 0 | +INF | INC = 0 |
| 1 | — | 0 | 1 | +INF | INC = 0 |
| 1 | — | 1 | 0 | +INF | INC = 1 |
| 1 | — | 1 | 1 | +INF | INC = 0 |
| 0 | — | — | — | -INF | INC = 0 |
| 1 | — | 0 | 0 | -INF | INC = 1 |
| 1 | — | 0 | 1 | -INF | INC = 1 |
| 1 | — | 1 | 0 | -INF | INC = 1 |
| 1 | — | 1 | 1 | -INF | INC = 1 |
| 0 | — | — | — | TO 0 | INC = 0 |
| 1 | — | 0 | 0 | TO 0 | INC = 0 |
| 1 | — | 0 | 1 | TO 0 | INC = 0 |
| 1 | — | 1 | 0 | TO 0 | INC = 1 |
| 1 | — | 1 | 1 | TO 0 | INC = 0 |
| 0 | — | 0 | 0 | NEAR | INC = 0 |
| 0 | — | 0 | 1 | NEAR | INC = 0 |
| 0 | 0 | 1 | 0 | NEAR | INC = 0 |
| 0 | 1 | 1 | — | NEAR | INC = 1 |
| 0 | — | 1 | 1 | NEAR | INC = 1 |
| 1 | 0 | 0 | 0 | NEAR | INC = 0 |
| 1 | 1 | 0 | 0 | NEAR | INC = 1 |
| 1 | 0 | 0 | 1 | NEAR | INC = 0 |
| 1 | 1 | 0 | 1 | NEAR | INC = 0 |
| 1 | 0 | 1 | 0 | NEAR | INC = 1 |
| 1 | 1 | 1 | 0 | NEAR | INC = 1 |
| 1 | 0 | 1 | 1 | NEAR | INC = 1 |
| 1 | 1 | 1 | 1 | NEAR | INC = 1 |

13. A method of structuring mantissa data flow and handling within a floating-point multiply accumulate unit (FMAC) having inputs A, B and C, each input comprising a sign, an exponent, and a mantissa, the method comprising:
   a) converting mantissa inputs into 2's complement form;
   b) processing the mantissa inputs through a plurality of adders and shifters, a multiply unit, and a leading bit anticipator; and
   c) generating an unrounded, conditionally inverted 2's complement (A*B)+C result associated with a single increment bit which is indicative of whether the unrounded, conditionally inverted 2's complement (A*B)+C result needs to be incremented.

14. A method as in claim 13, further comprising:
   a) setting the single increment bit (INC bit) associated with the unrounded, conditionally inverted 2's complement (A*B)+C result in response to a selected rounding mode, and current L, G, S and sign bits; and
   b) outputting the unrounded, conditionally inverted 2's complement (A*B)+C result and its associated INC bit.

15. A method as in claim 14, further comprising:
   a) absorbing an INC bit associated with a C mantissa input either prior to, or during, said processing through the multiply unit; and
   b) absorbing an INC bit associated with an A or B mantissa input during multiplication of operands A and B.

16. A method as in claim 14, wherein setting a single INC bit comprises setting the INC bit in accordance with the following truth table:

| SIGN BIT | L BIT | G BIT | S BIT | ROUNDING MODE | ACTION |
|---|---|---|---|---|---|
| 0 | — | 0 | 0 | +INF | INC = 0 |
| 0 | — | — | 1 | +INF | INC = 1 |
| 0 | — | 1 | — | +INF | INC = 1 |
| 1 | — | 0 | 0 | +INF | INC = 0 |
| 1 | — | 0 | 1 | +INF | INC = 0 |
| 1 | — | 1 | 0 | +INF | INC = 1 |
| 1 | — | 1 | 1 | +INF | INC = 0 |
| 0 | — | — | — | -INF | INC = 0 |
| 1 | — | 0 | 0 | -INF | INC = 1 |
| 1 | — | 0 | 1 | -INF | INC = 1 |
| 1 | — | 1 | 0 | -INF | INC = 1 |
| 1 | — | 1 | 1 | -INF | INC = 1 |
| 0 | — | — | — | TO 0 | INC = 0 |
| 1 | — | 0 | 0 | TO 0 | INC = 0 |
| 1 | — | 0 | 1 | TO 0 | INC = 0 |
| 1 | — | 1 | 0 | TO 0 | INC = 1 |
| 1 | — | 1 | 1 | TO 0 | INC = 0 |
| 0 | — | 0 | 0 | NEAR | INC = 0 |
| 0 | — | 0 | 1 | NEAR | INC = 0 |
| 0 | 0 | 1 | 0 | NEAR | INC = 0 |
| 0 | 1 | 1 | — | NEAR | INC = 1 |
| 0 | — | 1 | 1 | NEAR | INC = 1 |
| 1 | 0 | 0 | 0 | NEAR | INC = 0 |
| 1 | 1 | 0 | 0 | NEAR | INC = 1 |
| 1 | 0 | 0 | 1 | NEAR | INC = 0 |
| 1 | 1 | 0 | 1 | NEAR | INC = 0 |
| 1 | 0 | 1 | 0 | NEAR | INC = 1 |
| 1 | 1 | 1 | 0 | NEAR | INC = 1 |
| 1 | 0 | 1 | 1 | NEAR | INC = 1 |
| 1 | 1 | 1 | 1 | NEAR | INC = 1 |

17. An FMAC as in claim 1, wherein the 2's complement adding logic comprises:
   a) a partial product merger for adding the aligned portion of the C operand to the (A*B) partial products; and
   b) a 2's complement adder which receives the outputs of the partial product merger and produces the sum.

18. An FMAC as in claim 17, wherein the normalization logic comprises:
   a) a leading bit anticipator which receives the outputs of the partial product merger; and b) a shifter for shifting the sum under control of the leading bit anticipator.

19. An FMAC as in claim 18, further comprising:

a) a HI_C masker for masking those bits of a C operand which exceed a range of the (A*B) partial products; and wherein b) the logic coupled to the normalization logic, which generates an unrounded bypass result, a single increment bit, and a final rounded result, comprises a HI_C merger for merging those bits of the C operand which exceed a range of the (A*B) partial products with an output of the normalization logic.

20. An FMAC as in claim 19, wherein the logic coupled to the normalization logic, which generates an unrounded bypass result, a single increment bit, and a final rounded result, comprises:

a) a conditional inverter which receives an output of the HI_C merger and generates the unrounded bypass result;

b) rounding logic which receives an output of the conditional inverter;

c) logic, coupled to the rounding logic, for setting the single increment bit; and d) a result incrementer, coupled to the logic for setting the single increment bit, for generating the final rounded result.

* * * * *